United States Patent
Holdsworth

(10) Patent No.: US 6,565,755 B1
(45) Date of Patent: May 20, 2003

(54) SLUDGE DENSITY MEASUREMENT FOR CONTROLLING A SLUDGE TREATMENT STAGE

(75) Inventor: Peter Holdsworth, Keighley (GB)

(73) Assignee: Ciba Specialty Chemicals Water Treatments Limited, Bradford (GB)

(*) Notice: Subject to any disclaimer, the term of this patent is extended or adjusted under 35 U.S.C. 154(b) by 0 days.

(21) Appl. No.: 09/889,810

(22) PCT Filed: Jan. 10, 2000

(86) PCT No.: PCT/EP00/00100

§ 371 (c)(1),
(2), (4) Date: Jul. 20, 2001

(87) PCT Pub. No.: WO00/43322

PCT Pub. Date: Jul. 27, 2000

(30) Foreign Application Priority Data

Jan. 21, 1999 (GB) .................................. 9901216

(51) Int. Cl.⁷ .......................... C02F 01/20; C02F 11/12
(52) U.S. Cl. ................ 210/709; 210/96.1; 210/197; 210/86; 210/513; 210/740; 210/744; 210/770; 95/243; 96/157; 73/61.71; 73/863.21
(58) Field of Search ................... 210/96.1, 740, 210/744, 197, 770, 805, 800, 86, 513, 532.1–534, 709; 73/863.21, 61.41, 61.71; 96/156, 157; 95/241, 243

(56) References Cited

U.S. PATENT DOCUMENTS

| | | |
|---|---|---|
| 4,130,481 A | 12/1978 | Chase et al. |
| 4,273,658 A | 6/1981 | Karman |
| 4,279,759 A | 7/1981 | Pardikes |
| 4,318,296 A | 3/1982 | Parker et al. |
| 5,902,487 A * | 5/1999 | Pickering et al. ........... 210/709 |

FOREIGN PATENT DOCUMENTS

| | | |
|---|---|---|
| CA | 968476 | 5/1975 |
| DE | 2239158 | 5/1973 |
| DE | 104963 | 4/1974 |
| EP | 0151747 | 8/1985 |
| EP | 0161077 | 11/1985 |
| EP | 0170332 | 2/1986 |
| FR | 1441464 | 5/1966 |
| GB | 2018235 | 10/1979 |
| GB | 2069858 | 9/1981 |
| SU | 1675228 | 9/1991 |
| WO | 96/31265 | 10/1996 |
| WO | 97/03925 | 2/1997 |

OTHER PUBLICATIONS

Derwent Abstr. 2000–041903 for JP 11309496 (1999).
Derwent Abstr. 1967:40601 for FR 1441464 (1966).
Derwent Abstr. 92–257325 for SU 1675228 (1991).
Derwent Abstr. 74–50284V for DD 104963 (1974).

* cited by examiner

*Primary Examiner*—Joseph W. Drodge
*Assistant Examiner*—Terry K. Cecil

(57) ABSTRACT

A process and apparatus therefore in which a sludge treatment stage 24 is controlled in response to the density or solids content of the sludge includes flowing sludge along a flow line 1 towards the treatment stage, taking a sample from the flow line 1, degassing the sample to produce a degassed sample, measuring the density or solids content of the degassed sample, and utilizing the measured degassed density or solids content of the degassed sample for controlling the treatment stage 24.

19 Claims, 1 Drawing Sheet

SLUDGE DENSITY MEASUREMENT FOR CONTROLLING A SLUDGE TREATMENT STAGE

FIELD OF THE INVENTION

This invention relates to the measurement of the density or solids content of sludge such as sewage sludge, low solids slurry or like material, containing gas bubbles.

BACKGROUND OF THE INVENTION

The treatment of sewage sludge or like slurries generally includes a de-watering process. To assist this process it is normal practice to add a material to the sludge to aid the separation of solids from the liquid, such additives being, for example, synthetic flocculants, polyelectrolytes and polymers. The dosage required for these additives is normally directly related to the solids content of the sludge. It follows, therefore, that for optimum treatment of the sludge that an accurate measurement of the solids content of the sludge is needed.

Known methods for finding the solids content of sludge comprise measuring the sludge mass flow, for example from a sludge bulk storage vessel, and measuring the liquid carrier mass flow from which the mass flow of the solids can be calculated as follows:

Solids mass flow=Sludge mass flow−Liquid carrier mass flow.

A problem with this kind of measurement is that due, for example, to the sludge digestion process or natural fermentation many types of sludge contain dissolved gas, entrapped gas bubbles or both. The presence of this gas can seriously affect the measurement of the sludge density or solids content. Detectors based on ultrasound or microwaves will "see" gas bubbles as high solids particles whereas for those gauges which measure sludge density on radiometric or coriolis principles the presence of gas bubbles has the effect of giving a reduced reading for the density. Moreover the gas content of the sludge is very likely to be variable so that it is not possible to provide for some reliable standard compensation for gas content in the solids content calculation.

In order to deal with this problem degassers have been fitted to the main sludge line. While these help to some extent it has been found that in practice accurate on line measurement of sludge density is not possible. It has therefore been proposed to provide a by pass system having a solids/density gauge through which a sample of sludge from the main sludge feed line is passed under controlled conditions. After the measurement has been taken the sample may be returned to the main sludge line, returned to the bulk sludge storage vessel or merely drained away. In some cases the sample is subjected to increased pressure in order to try to reduce the effect on the solids/density measurement of gas bubbles in the sludge. However there are some sludges whose gas content is too high and/or too variable for these proposals to yield reliable results.

The present invention has been made in order to deal with these difficulties.

SUMMARY OF THE INVENTION

According to the invention there is provided a process in which a sludge treatment stage is controlled in response to the density or solids content of the sludge, comprising flowing sludge along a flow line towards the treatment stage, taking a sample from the flow line, degassing said sample to produce a degassed sample, measuring the density or solids content of the degassed sample, and utilising the measured density or solids content of the degassed sample for controlling the treatment stage.

Degassing of the sample may be conducted by continuously cycling the sample as a batch through degassing apparatus. During such cycling degassing comprises feeding the sample into a first tank and flowing the sample down an inclined plane into a second tank. The degassed sample may be made by continuing the degassing step of the process until a substantially constant value for solids content is measured. Alternatively the degassed sample may be made by continuing the degassing step for a predetermined time.

In one embodiment of the invention the sample is taken from the flow line through a feedpipe and admitted to the main chamber of a twin-chambered tank through a valve. As a result the level of sludge in the main chamber rises until it reaches a sensor having a switch which terminates the sludge inflow into the main chamber by closing said valve. Sludge is withdrawn from the main chamber through a second valve for example by suction supplied by a pump. The density or solids content of the sludge is measured by one or more on-line density or solids content measuring devices, a positive pressure being maintained on the sludge by said pump during said measurement. The said pressure is preferably held at a constant level during said measurement for example by means of a back pressure valve. After said measurement the sludge is conducted to the other chamber of said twin-chambered tank from whence it flows over a weir and down an inclined plane into the said main chamber. Sludge is either recirculated through the system or removed from the main chamber through valve means and transferred to a storage vessel or returned back into the flow line. If desired the twin chambered tank can be purged with fresh sludge from the flow line before degassing is carried out.

The invention can be applied particularly to sludge treatment which comprises treatment with flocculent and/or coagulant. Treatment can comprise dewatering to produce a cake.

The invention also provides apparatus for degassing sludge, comprising means for extracting sludge from a flow line, and a degassing circuit, comprising a degassing tank, means for withdrawing sludge from the degassing tank, one or more density or solids content measuring devices, means for transferring sludge from the degassing tank to said one or more density or solids content measuring devices, means for redirecting sludge back to said degassing tank from said one or more density or solids content measuring devices, and means to divert degassed sludge from said degassing tank.

Sludge diverted from said degassing tank, for example through an outlet valve, may be returned to the flow line or may be transferred to bulk storage.

In a preferred embodiment of the apparatus of the invention a feedpipe is provided for taking sludge from the flow line, there being a valve for controlling the flow of sludge through the feedpipe. A twin chambered degassing tank receives sludge from the feedpipe. The degassing tank has first and second chambers separated by a weir and an inclined plane and a sensor for detecting the level of sludge in the degassing tank and for controlling the admission of fresh sludge to the degassing tank. An outlet valve is provided in the degassing tank for transferring sludge to the one or more measuring devices and a pump acting against a back pressure valve provides for a positive pressure to be imposed on the sludge while it is subject to density or solids content measurement.

In this specification the term "degassed" does not mean necessarily that there is total removal of gas from the sludge but that the amount of gas in the sludge has been reduced to a level where stable density or solids content measurements are possible. References to "degassing" of sludge are to be understood in the same way.

DETAILED DESCRIPTION OF THE DRAWING

Figure 1:
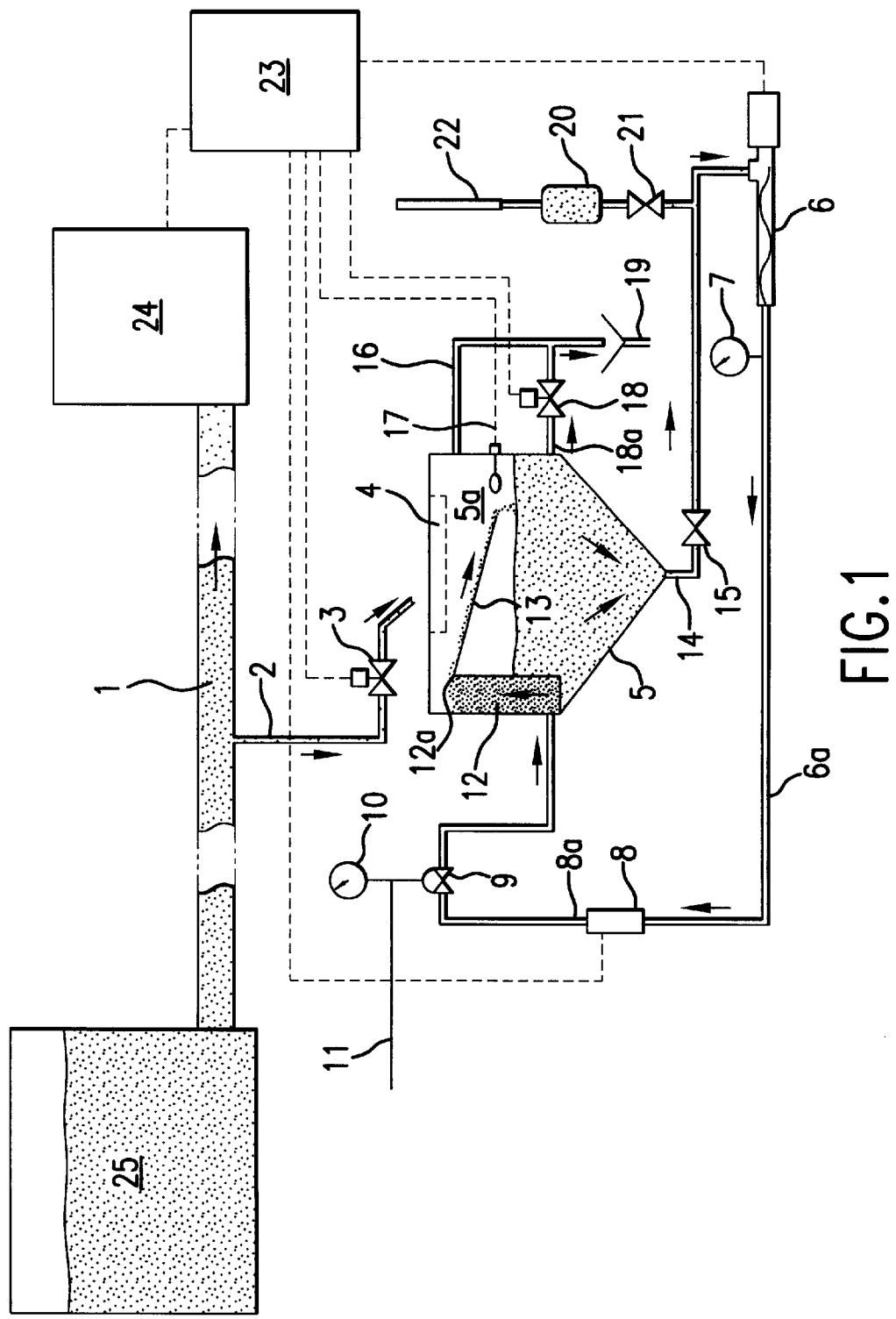
FIG. 1 shows diagrammatically a system for degassing a sludge sample and for measuring the density or solids content of the degassed sample.

Referring to the drawing sludge from a bulk storage tank 25 is conducted through main sludge flow pipe 1 to treatment stage 24. A feedpipe 2 leads from the flow pipe 1 for depositing sludge into the tank 5. A valve 3 controls the flow of sludge through the feedpipe 2. The tank 5 has two chambers, a main chamber 5a and a second chamber 12 having a weir 12a to which is attached an inclined flume plate 13 extending downwardly into chamber 5a. Although not shown in the drawing the angle of inclination of the flume plate is preferably adjustable. At the top of chamber 5a and below the outlet of feedpipe 2 a coarse filter basket is disposed. A high level switch 17 is provided in the side wall of the chamber 5a. The switch controls the operation of valve 3 and thus regulates the feed of sludge from feedpipe 2 to the chamber 5a.

The bottom of chamber 5a is in the form of an inverted cone to prevent sedimentation. At the apex of the cone is an outlet 14 which leads through valve 15 to a pump 6. The output from the pump 6 is delivered via line 6a to a density/solids measuring device 8 from which sludge is returned via line 8a and chamber 12 to chamber 5a. A back pressure valve 9 is located in line 8a between the measuring device 8 and the chamber 12. Chamber 12 may also have a sloping floor to prevent sedimentation. In the embodiment illustrated valve 9 is of the air operated non blocking type and a compressed air supply 11 is applied to the valve 9 at a pressure which can be measured by the gauge 10. The back pressure produced and maintained in the measuring device 8 and the lines 6a and 8a by virtue of the valve 9 and the pump 6 can be ascertained from the pressure gauge 7.

A vent pipe 22, whose purpose will be explained later, is provided upstream of pump 6. The pipe 22 is provided with a small buffer 20 so that air is not drawn into the system through the vent pipe. A valve 21 is provided for isolating the vent pipe 22 from the rest of the system. Note also that the top of the vent pipe should be at a level higher than the maximum possible level of sludge in chamber 5a. In the illustrated embodiment the maximum level of sludge in chamber 5a is defined by overflow pipe 16 in the side wall of chamber 5a. The provision of vent pipe 22, buffer 20, and valve 21 is not essential but is helpful when the sludge being sampled has a high gas content.

A drain line 18a extends through the side wall of chamber 5a towards the bottom thereof and leads via drain valve 18 to drain 19. If desired the drain can be replaced by a pump for returning sludge drained through line 18a to the flow pipe 1 or bulk storage tank 25.

The system operates as follows. Valve 15 remains open at all times except when the system is shut down for maintenance. Valve 18 is closed and valve 3 opened. Sludge from flow pipe 1 is delivered via feedpipe 2 to chamber 5a. When the level of sludge in chamber 5a reaches the high level switch 17 valve 3 is closed and the feed of sludge interrupted. Sludge withdrawn from the bottom of chamber 5a by pump 6 is circulated through the density/solids measuring device 8 to the chamber 12 spilling over the weir 12a and running down the flume plate 13 back into chamber 5a. Preferably there should be an even flow of sludge across the flume plate in the form a thin film this being achieved by adjustment of the angle of inclination of the plate and, if necessary by adjusting the disposition of tank 5 for example by adjustable feet (not shown). As already described, pressure is applied to the sludge while it is subject to measurement by the device 8. For optimum results this pressure should be constant.

When the sludge is first introduced into chamber 5a any large pockets of entrained gas are released to atmosphere; indeed all the time that 7. sludge is in chamber 5a gas is released to atmosphere. As sludge is drawn into outlet 14 there is an increase in velocity which causes a small localised pressure drop which in turn causes degassing to occur. Gas released at this stage can escape to atmosphere from the system through vent pipe 22.

After passing the back pressure valve 9 the sludge experiences a sharp pressure drop which also promotes degassing. Similarly as the sludge spills over the weir 12a there is a velocity increase which cause a local pressure drop which promotes further degassing.

Micro gas bubbles tend to be trapped in the sludge due to its viscosity. In normal circumstances these micro bubbles can take a long time to rise to the surface and escape to atmosphere. By flowing the sludge down the flume plate in the form of thin film trapped micro bubbles can rise to the surface more readily.

The system is run continuously resulting in progressive degassing until substantially stable readings are obtained from the measuring device 8. This can take about ten to fifteen minutes but in practice depends on the amount of gas in the sludge. The mean of the substantially stable readings, say the readings over the final two minutes, can then be used to control dosage of additives at the treatment stage 24.

Valve 18 is now opened and the sludge drained out of tank 5. If desired the chamber 5a can be purged with fresh sludge whereafter the cycle of operations begins again with a fresh sample. Normally the rate of change of solids withdrawn from bulk storage is fairly low so that a time interval of ten to fifteen minutes between measurements of successive sludge samples does not adversely affect reasonable control of dosage.

The system just described can be controlled by a PLC 23, a computer or by a hard wired control panel with signal processors.

It will be apparent that with the system of the invention sludge density/solids can be almost continuously monitored and fine adjustment made to dosages at the treatment stage to take account of variations in the sludge density/solids measurements.

The invention is not limited to the above described specific embodiment and many modifications can be made. For example instead of running the system with a sample until stable readings are obtained it is possible to limit the degassing procedure for a sample to a predetermined time.

What is claimed is:

1. A process in which a sludge treatment stage is controlled in response to the density or solids content of the sludge, comprising flowing sludge along a flow line towards the treatment stage, taking a sample from the flow line, degassing said sample to produce a degassed sample, measuring the density or solids content of the degassed sample, and utilising the measured degassed density or solids content of the degassed sample for controlling the treatment stage.

2. A process according to claim 1, in which degassing is conducted by continuously cycling the sample as a batch through degassing apparatus.

3. A process according to claim 2, in which, during cycling, the degassing comprises feeding the sample into a first tank and flowing the sample down an inclined plane into a second tank.

4. A process according to claim 3, in which the sample taken from the flow line through feedpipe(2) is admitted through a valve (3) to the second tank being the main chamber of a two chambered tank (5), the level of sludge in the second tank rises until it reaches a sensor (17) and fresh sludge inflow is terminated by the closing of said valve(3), sludge is withdrawn from the second tank through a second valve(15) by suction, the density or solids content of the sludge is measured by one or more on-line density or solids content measuring devices(8), a positive pressure is maintained on the sludge during said measurement, after said measurement the sludge is conducted to the first tank(12) flows over a weir(12a) and down said inclined plane into the second tank, and sludge is recirculated through the system or removed from the second tank.

5. A process according to claim 4, in which the degassing apparatus is purged with fresh sludge from the flow line before the degassing is carried out.

6. A process according to claim 4, in which the degassed sample is made by continuing degassing for a predetermined time.

7. A process according to claim 3, in which the degassing apparatus is purged with fresh sludge from the flow line before the degassing is carried out.

8. A process according to claim 3, in which the degassed sample is made by continuing degassing for a predetermined time.

9. A process according to claim 2, in which the degassing apparatus is purged with fresh sludge from the flow line before the degassing is carried out.

10. A process according to claim 9, in which the degassed sample is made by continuing degassing for a predetermined time.

11. A process according to claim 2, in which the degassed sample is made by continuing degassing for a predetermined time.

12. A process according to claim 1, in which the degassed sample is made by continuing degassing until a substantially constant value for density or solids content is measured.

13. A process according to claim 1, in which the degassed sample is made by continuing degassing for a predetermined time.

14. A process according to claim 1, in which the treatment stage comprises treatment with flocculant and/or coagulant.

15. A process according to claim 1, in which the treatment stage comprises dewatering to produce a cake.

16. Apparatus for degassing sludge, comprising means for extracting sludge from a flow line, and a degassing circuit, comprising a degassing tank, means for withdrawing sludge from the degassing tank, one or more on-line density or solids content measuring devices, means for transferring sludge from the degassing tank to said one or more density or solids content measuring devices, means for redirecting sludge back to said degassing tank from said one or more density or solids content measuring devices, and means to divert degassed sludge from said degassing tank.

17. Apparatus according to claim 16, in which the means for extracting sludge from the flow line comprises a feedpipe and a valve to control flow of sludge through the feedpipe, the degassing tank comprises two chambers separated by a weir and an inclined plane, a sensor is provided in the degassing tank for detecting the level of sludge in the degassing tank and controlling the admission of fresh sludge to the degassing tank, an outlet valve is provided in the degassing tank for transferring sludge to the one or more measuring devices, and a pump acting against a back pressure valve to impose positive pressure on the sludge while it is subject to density or solids content measurement.

18. Apparatus according to claim 17, in which the means to divert degassed sludge from the degassing tank comprises a valve whereby said degassed sludge may be returned to the flow line or transferred to bulk storage.

19. Apparatus according to claim 16, in which the means to divert degassed sludge from the degassing tank comprises a valve whereby said degassed sludge may be returned to the flow line or transferred to bulk storage.

* * * * *